Oct. 4, 1960        B. R. MOGARD        2,954,616
UNDERLAY FOR PUZZLES ETC. USED FOR EDUCATIONAL PURPOSES
Filed May 24, 1956
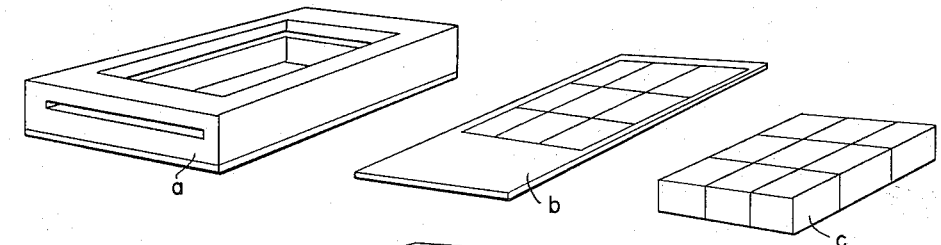
FIG. 1
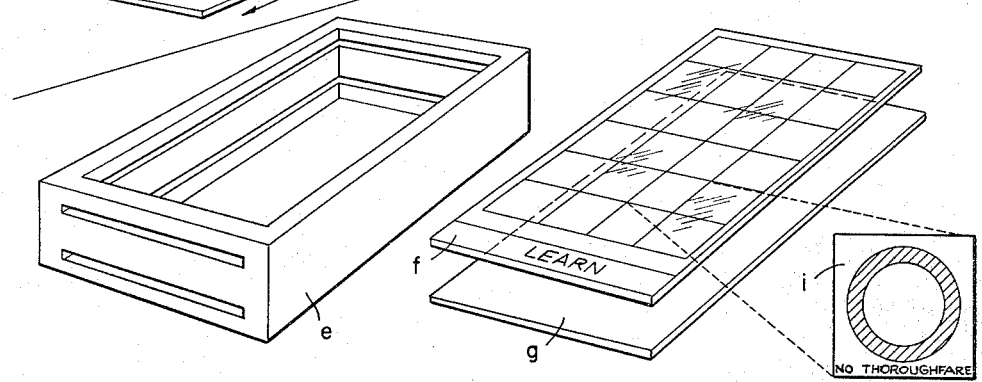
FIG. 2
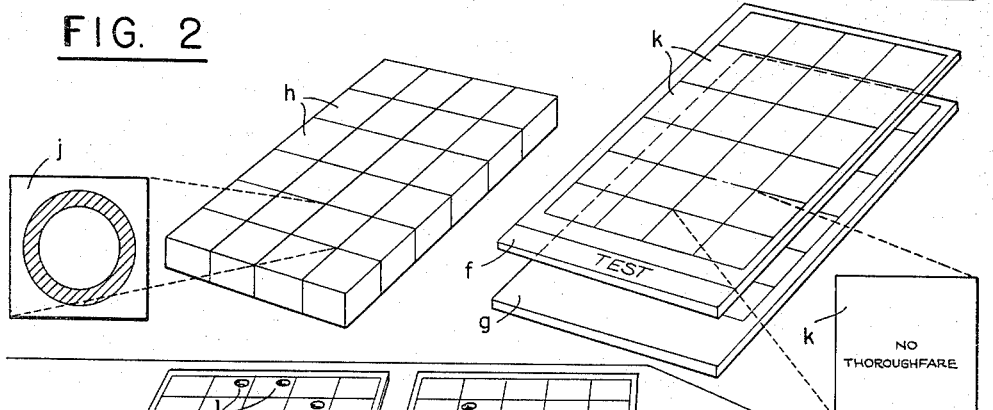
FIG. 3
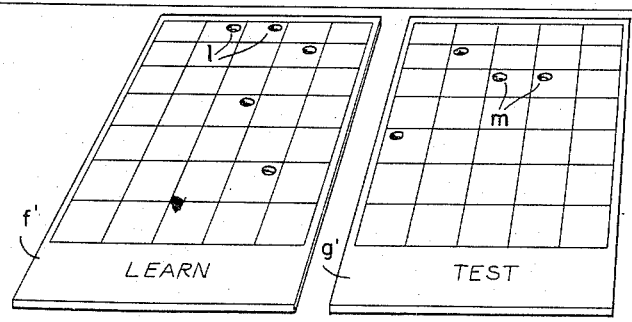
*INVENTOR.*
BROR ROBERT MOGARD
BY Hane and Nydick
ATTORNEYS

United States Patent Office 2,954,616
Patented Oct. 4, 1960

2,954,616

UNDERLAY FOR PUZZLES, ETC., USED FOR EDUCATIONAL PURPOSES

Bror Robert Mogard, Valhallavagen 153, Stockholm, Sweden

Filed May 24, 1956, Ser. No. 587,172

Claims priority, application Sweden, June 3, 1955

6 Claims. (Cl. 35—48)

The present invention refers to a characteristically designed underlay for puzzles and similar games, which provides a simple means of using such games for educational purposes.

A simple form of the invention is illustrated in Fig. 1. A holder $a$ is made with a groove in which a slide $b$ can be inserted. The pieces are indicated by $c$. When the slide is inserted in the holder, the pieces are laid upon it. When all pieces are placed in position, they are compactly framed within the walls of the holder. When the slide is thereafter withdrawn and the holder is held in the proper manner, the pieces fall down into the holder $d$.

In order to be able to check whether each individual piece is laid in its proper place on the underlay (the slide), holes may be made in the bottom or sides of the holder or the holder may be made of transparent material so that pictures or signs on the pieces will be visible when the pieces are enclosed in the holder.

To reduce the height of the holder it may be advisable to provide two grooves for the slide. The lower groove is used when the pieces are laid on the underlay (the slide), whereby the walls rising above the slide will be sufficiently high to be able to retain the pieces securely when the slide is withdrawn. The upper groove is used when the pieces are enclosed in the holder by inserting the slide above them.

A more complex form of the invention is illustrated in Fig. 2. A frame $e$ of wood, plastic or similar material is provided with two grooves. $f$ is a transparent slide of glass, plastic or similar material, and $g$ is a non-transparent slide. The pieces are indicated by $h$.

When the two slides $f$ and $g$ are inserted in their respective grooves, a space is formed between them such that the pieces are tightly enclosed within the two slides and the walls of the frame.

An example of how the design illustrated in Fig. 2 may be employed for educational purposes is as follows. The piece $j$ is laid on square $i$ of the transparent slide $f$, which may suitably be marked with the word "Learn." By superimposing identical pictures on one another, it is learnt that the traffic sign on piece $j$ means "No Thoroughfare."

When all pieces have been placed on the slide $f$, the slide is withdrawn and the pieces fall down into the holder, the bottom of which is in this case formed by the slide $g$. When the slide $f$ is reinserted, the pieces are enclosed within the two slides and the walls of the frame, and a check can be made whether the pieces have been correctly laid out on the slide $f$ by comparing the pictures on the pieces with those on the transparent slide above them.

A test of the knowledge thus acquired can now be made by turning the frame upside down so that the non-transparent slide $g$ is uppermost. The piece $j$ is now laid, preferably with the picture side downwards, on the square $k$ which carries the text "No Thoroughfare" but no picture. When all pieces have been laid out on the non-transparent slide $g$ which may suitably be marked with the word "Test," the pieces are enclosed in the frame in the usual manner. By turning the frame upside down, it can then be seen whether the pieces are correctly placed, i.e. whether the questions are correctly answered, by comparing the pictures on the pieces with those on the transparent slide.

A third form of the invention is similar to that illustrated in Fig. 2 with the exception that the two slides $f$ and $g$ instead of being transparent and non-transparent respectively, are both non-transparent but provided with holes in every square that serve as viewing means for observing through the opposite sides thereof. When the pieces are enclosed within the space between the inserted slides, the pictures or signs on the pieces will be visible through the holes.

An example of how such a form of the invention can be employed for educational purposes is as follows. Each slide may suitably be marked with the word "Learn" on one side and the word "Test" on the other. The squares on which the pieces are laid are marked on the "Learn" side with a picture and text, an example of which is $i$ in Fig. 2. The pieces carry pictures only, an example of which is $j$ in Fig. 2. By superimposing identical pictures on one another it is learnt that the traffic sign on piece $j$ means "No Thoroughfare." When all pieces have been placed on the slide the slide is withdrawn and the pieces fall down into the holder as described above. When the slide is reinserted in the same groove, a check can be made that the pieces are correctly placed by comparing the pictures on the slide with those on the pieces that are visible through the holes in the slide. On the "Test" side the squares on which the pieces are placed are marked with a text, an example of which is $k$ in Fig. 2. The question on square $k$—"No Thoroughfare"—is correctly answered by placing piece $j$ on this square. When all pieces have been placed on the slide, the slide is withdrawn and the pieces fall down into the holder as described above. If the slide is now turned upside down so that the "Learn" side is uppermost and the slide is then inserted in the same groove, a check can be made that the pieces are correctly placed by comparing the pictures on the slide with those on the pieces that are visible through the holes in the slide. If the pieces have pictures on both sides they can be used for games on both slides, whereby the capacity of the apparatus is doubled compared with the aforementioned form comprising a transparent and a non-transparent slide. A special finesse can be attained by so arranging the pictures on the two sides of the pieces that, when the pictures on one side of the pieces are correctly grouped in relation to the pictures of one slide, the pictures on the other side of the pieces are wrongly grouped in relation to the pictures on the other slide. When changing over from a game on one slide to a game on the other slide, the pictures will thereby be automatically shuffled in the frame.

In the forms of the invention described above, the pieces were retained in their original positions, when the slide was withdrawn, by the walls rising above the slide. In other forms the pieces may be retained in other ways, for example each individually in a grid-like structure or by means of only partially upstanding walls.

In a further form of the invention it may be conceived that, after the slide is withdrawn, the pieces fall directly on a table or similar underlying surface, whereby the space formed between the table and the slide so encloses the pieces that they remain in the same grouping as when they were placed on the slide before it was withdrawn.

The first described form of the invention is particularly suited to ordinary puzzles which usually have pictures or signs on one side of the pieces. One advantage of the invention in this connection is that the pieces are always automatically boxed in when the slide is inserted at the end of the game.

What I claim is:

1. An educational testing device comprising, in combination, a hollow rectangular frame defining a central housing open at the top and closed at the bottom ends thereof, a slot intermediate said top and bottom ends extending through one side of said frame toward the opposite side, a panel slidably supported within said slot for reciprocating longitudinal movement into and out of said housing, both sides of said panel comprising separate sections each having viewing means for observing through the opposite sides thereof, each section on one side of said panel having test question indicia, each section on the opposite side of said panel corresponding to the respective section on said one side of said panel having the same test question indicia and correct answer indicia therefor, a plurality of complementary members each being of substantially the same size and shape and having identifying answer indicia on one side thereof corresponding to the answer to each question indicia of each section of said one side of said panel, and all of said complementary members filling the opening in the top of said frame when placed in side by side relationship with each other upon said panel sections, whereby the correctness of the selected placement of said answer members upon the question sections of said one side of said panel may be judged by removing said panel from said frame to invert it and place it over said answer members for the purpose of comparing through said viewing means the answer indicia of the sections on said opposite side of said panel with the answers on said one side of said answer members.

2. An educational device as set forth in claim 1, wherein said slot is parallel to the top and bottom ends of said housing.

3. An educational device as set forth in claim 2, wherein said closed bottom comprises a bottom wall, the interior of said housing being visible from the exterior side of said bottom wall, said members in response to a withdrawal of said panel being retained within said housing and in proximity to said bottom wall, the position of each one of said members being visible through said bottom wall.

4. An educational device as set forth in claim 3, wherein the exterior side of said bottom wall includes symbols arranged in a manner similar to the corresponding symbols on said panel.

5. An educational device comprising, in combination, a hollow rectangular frame defining a central housing open at the top and bottom ends thereof, a pair of spaced apart parallel slots extending through one side of said frame intermediate the top and bottom ends thereof toward an opposite side thereof, two panels slidably supported one within each one of said slots for reciprocating longitudinal movement relative to the interior of said housing, each panel including separate sections of similar size and shape on both sides, each section on one side of each said panels having an individual identifying question indicia associated therewith and the corresponding section on the opposite side of said panel having the same identifying question indicia and correct answer indicia therefor, all of said sections having viewing means for observing through the opposite sides thereof, a plurality of complementary members of substantially the same size and shape as said panel sections each having different identifying indicia on both sides, the indicia on one side of said members corresponding to the answers to the question on one of said panels, the indicia on the other side of said members corresponding to the answers to the questions on the other one of said panels, whereby the correctness of the selected placement of said members upon the question indicia on said one side of a selected panel may be judged by inverting said selected panel relative to said members for the purpose of comparing through said viewing means the answer indicia of the sections of said opposite side of said selected panel with the answer indicia on the facing side of said answer members.

6. An educational device as set forth in claim 5, wherein the space between said panels is substantially the same as the thickness of said members whereby said members may be immovably supported between said panels within said housing.

References Cited in the file of this patent

UNITED STATES PATENTS

| 1,604,127 | Lambert | Oct. 26, 1926 |
| 1,615,077 | Gouldin | Jan. 18, 1927 |
| 1,987,496 | Springborn | Jan. 8, 1935 |
| 2,007,530 | Greene | July 9, 1935 |
| 2,693,963 | Moscato | Nov. 9, 1954 |

FOREIGN PATENTS

| 10,653 | Great Britain | May 2, 1912 |
| 650,175 | Great Britain | Feb. 14, 1951 |